Figure 1:
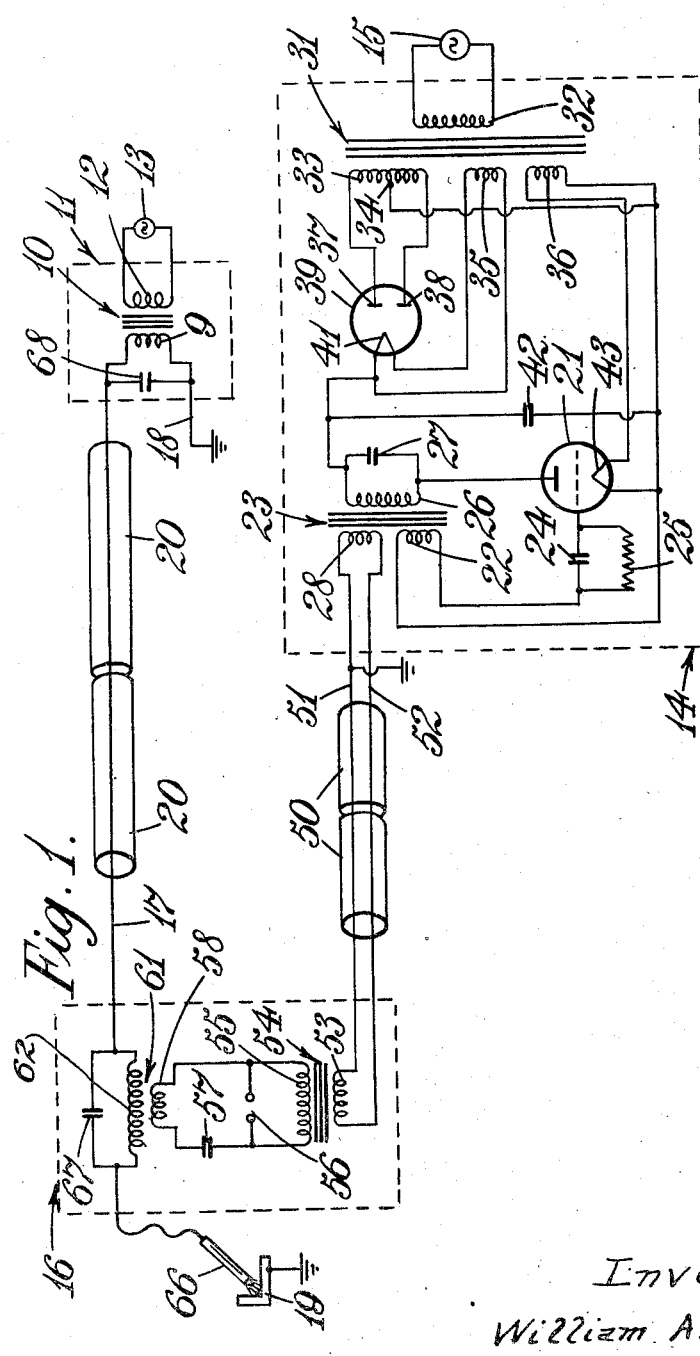

Sept. 30, 1952    W. A. APPLETON    2,612,582
COMBINED ARC WELDING ELECTRODE HOLDER
AND HIGH-FREQUENCY GENERATOR
Filed July 7, 1950    2 SHEETS—SHEET 1

Inventor
William A. Appleton
By Young, Emery & Thompson
Attys.

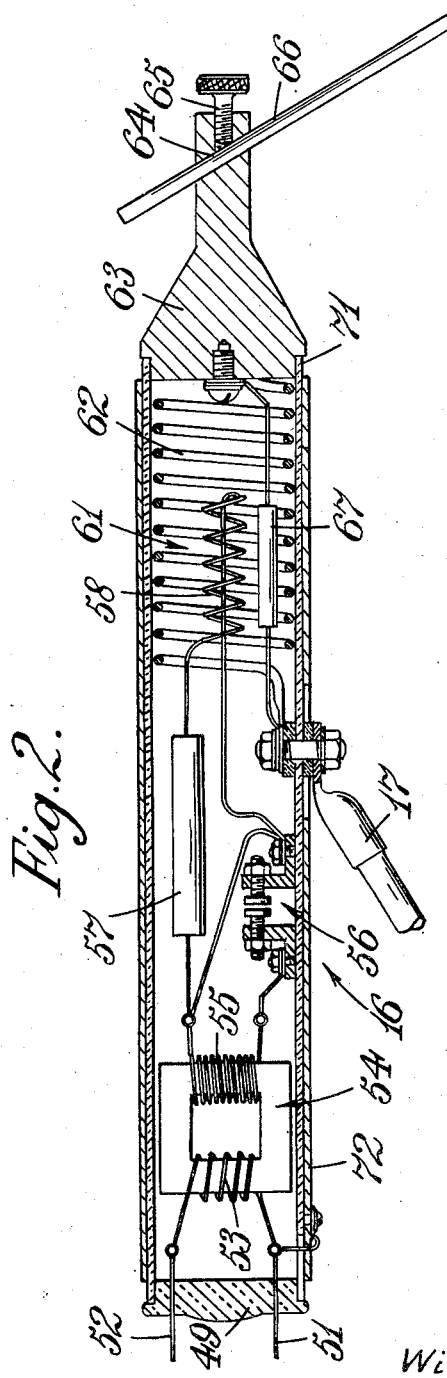

Patented Sept. 30, 1952

2,612,582

UNITED STATES PATENT OFFICE 2,612,582

COMBINED ARC WELDING ELECTRODE HOLDER AND HIGH-FREQUENCY GENERATOR

William Arnold Appleton, Wembley, England, assignor to Arc Manufacturing Company Limited, London, England Application July 7, 1950, Serial No. 172,405
In Great Britain July 11, 1949

5 Claims. (Cl. 219—8).

1

The present invention relates to the welding of metals by the electric arc and more particularly to improvements in means for causing an arc to strike without the welding electrode coming into contact with the metal to be welded and/or for maintaining the arc.

It is known that a high voltage current at a relatively high frequency super-imposed upon the welding current fed to the welding electrode will cause ionisation in the gap between the electrode and the work piece enabling the welding arc to strike.

Hitherto, the high voltage high frequency superimposed current has been carried by the conductor along which welding current is led from its source of supply. It has been found that such high voltage high frequency electrical current has a detrimental effect upon normal insulation of the flexible cable and the loss in the cable due to its comparatively low power factor and its length is of a high order. Further, the frequency of the super-imposed current is such that radiation particularly from the cable interferes with radio reception over a considerable radius.

It is an object of the invention to provide for electric arc welding, improved apparatus comprising an arc-welding-electrode holder, means for supplying welding current to the electrode and to a workpiece to maintain a welding arc across a gap between the electrode and the workpiece, a high frequency high voltage generator carried by the electrode holder and arranged to produce across the gap a high frequency high voltage potential to effect initial ionisation of the gap thereby to assist in initiation of the arc, and a generator of lower frequency lower voltage electrical energy for supplying the high frequency generator, which lower frequency generator is constructed and arranged to be located remote from the electrode holder and to be connected to the high frequency generator by an electric cable.

The high frequency generator is preferably mounted within the electrode holder. The lower frequency is preferably below the range of broadcasting frequencies so that there is no interference to broadcasting. The high frequency generator is preferably arranged to generate at radio frequency and the lower frequency generator is preferably arranged to generate at an audio frequency. The output from the source may advantgeously be led to the generator by a cable separate from that employed to carry the welding current.

The generator is preferably a spark gap oscillator. Such an oscillator, when supplied with energy of the lower frequencies contemplated is of small dimensions and is sufficiently robust to stand up to the hard usage to which it may be subjected through its location.

It will be understood that the invention is equally applicable to the arc welding of a variety of materials whether performed by electrodes which melt to form a weld or by non-consumable electrodes as, for example, in inert gas welding employing tungsten electrodes.

The invention includes for use in electric arc welding, a welding electrode holder comprising a conducting end-piece, means for securing a conducting electrode to said end-piece in electrical connection therewith, an insulating container attached to the end-piece, a high voltage high-frequency generator within the insulating container; which generator comprises an iron-cored coupling transformer having primary and secondary windings, means for connecting the primary winding of said coupling transformer to a source of electrical energy at a lower voltage and a lower frequency, an air-cored voltage step-up transformer having primary and secondary windings, an oscillatory circuit comprising a spark-gap, a condenser and the primary winding of said air-cored transformer, means connecting the oscillatory circuit to the secondary winding of the coupling transformer to energise the oscillatory circuit, a tuning condenser, and means connecting said tuning condenser across said secondary winding of the air-cored transformer; insulated terminal means carried by the insulating container for the attachment of a connection from a source of welding current, means connecting said secondary winding between the end-piece and said terminal means, and a conducting screen around said insulating container.

A specific embodiment of the invention will now be described by way of example and with reference to the accompanying drawings in which:

Figure 1 is a circuit diagram of apparatus for electric arc welding and embodying the invention; and Figure 2 is a sectional view of an electrode holder embodying the invention and comprising part of the apparatus of which the circuit diagram is shown in Figure 1.

The apparatus comprises, in this example, a welding transformer 10 having its primary winding 12 connected to A. C. supply mains 13, an oscillator 14 supplied from A. C. supply mains 15 (which are preferably the same as the supply mains 13), and the electrode holder 16.

The welding transformer 10 is of normal construction and one end of its secondary winding 9 is connected by a cable 20 having a conductor 17 to the electrode holder 16. The other end of its secondary winding 9 is connected to earth by a conductor 18, and the workpiece 19 is also connected to earth.

The oscillator 14, which is of normal construction, comprises a grid-controlled thermionic valve 21 having one winding 22 of a transformer 23 connected in its grid circuit, together with a grid condenser 24 and a grid leak resistance 25, and having another winding 26 of the transformer connected in its anode circuit. The winding 26 is tuned by a condenser 27 and an output winding 28 is provided on the transformer 23. The valve 21 is supplied from a mains transformer 31 having a primary winding 32, a secondary winding 33 center-tapped at 34 and two valve-heater supply windings 35, 36. The ends of the winding 33 are connected respectively to the two anodes 37, 38, of a double-diode thermionic rectifier valve 39 of which the filament 41 is supplied from winding 35. The anode circuit of valve 21 is connected between the filament 41 and the center tap 34, a reservoir condenser 42 being connected across it. The heater 43 of the valve 21 is supplied from the winding 36.

The output winding 28 provides an output of about 10 to 20 volts at a frequency between 2,000 and 12,000 cycles/second, which is connected by a cable 50 having conductors 51 and 52 to the primary winding 53 of an iron-cored step-up transformer 54. The secondary winding 55 of the transformer 54 has a spark-gap 56 connected across it, and also a condenser 57 in series with the primary winding 58 of an air-cored step-up transformer 61. One end of the secondary winding 62 of the transformer 61 is connected to a metal end-piece 63 having a passageway 64 and a clamping screw 65 for retaining a metal welding electrode 66 in the passageway. The other end of the winding 62 is connected to the cable conductor 17. A tuning condenser 67 is also connected across the winding 62.

The circuit containing the spark-gap 56 and the condenser 57 generates at radio frequency in well-known manner and an output of about 2,000 to 3,000 volts at a frequency of 10 to 30 megacycles/second is consequently provided across the winding 62. The inherent capacity between the conductor 20 and earth is such that the capacity has a low impedance at radio frequencies and therefore completes the radio frequency circuit to the earthed work-piece. A by-pass condenser 68 is connected across the secondary winding of the welding transformer to provide a low-impedance path for any radio-frequency current which may reach that end of the conductor 17. The radio-frequency output is therefore applied between the welding electrode and the work-piece to effect the desired initial ionisation of the welding gap.

The electrical components carried by the electrode holder are secured within an insulating sleeve 71 which is attached to the end-piece 63, and the sleeve 71 is surrounded by a metal screen 72 which is connected to the conductor 51 which is connected to earth near to the oscillator. The end of the insulating sleeve is closed by an insulating cap 49.

It will be appreciated that the apparatus in this example comprises three main units, viz: the electrode holder 16, the welding transformer unit 11 and the oscillator 14. The electrical components contained respectively within those units are shown enclosed within rectangles of broken lines in Figure 1. The welding transformer unit and the oscillator unit are relatively bulky and are normally kept stationary and remote from the work-piece during welding, preferably near to one another. The electrode holder is connected to the welding transformer and to the oscillator by the flexible cables 20 and 50 and is readily portable so that it may be moved as required during welding. It will also be appreciated that as the radio frequency current is generated within the electrode holder, and not at a position remote therefrom, the required output of the generator is very much less as the radio-frequency energy losses which are inevitable when radio-frequency current is carried by a cable from a remote position are avoided. The deleterious effects of such high voltage high frequency current on the cable carrying the low voltage heavy welding current, which effects are associated with such losses, are avoided or are reduced to negligible proportions. Radiation which accompanies such losses and is liable to interfere with radio reception is also minimized. The earthed metal screen 72 shields the radio frequency generator, which is compact and of small dimensions. The cable 20 may be screened if desired by means of an insulated conducting sheathing. Alternatively the by-pass condenser 68, or an additional by-pass condenser may be connected between the conductor 17 and earth, adjacent to the electrode holder.

It will be appreciated that the invention is not restricted to the details of the foregoing example. For instance, the valve oscillator may be replaced by any other convenient conventional generator giving a suitable output, e. g. a rotary converter. The electrode holder need not be portable, for instance, it may be incorporated in an automatic welding machine in which the holder is moved mechanically over or along the work-piece.

I claim:

1. For use in electric arc welding, a welding electrode holder comprising a conducting end-piece, means for securing a conducting electrode to said end-piece in electrical connection therewith, an insulating container attached to the end-piece, a high voltage high-frequency generator within the insulating container; which generator comprises an iron-cored coupling transformer having primary and secondary windings, means for connecting the primary winding of said coupling transformer to a source of electrical energy at a lower voltage and a lower frequency, an air-cored voltage step-up transformer having primary and secondary windings, an oscillatory circuit comprising a spark-gap, a condenser and the primary winding of said air-cored transformer, means connecting the oscillatory circuit to the secondary winding of the coupling transformer to energize the oscillatory circuit, a tuning condenser, and means connecting said tuning condenser across said secondary winding of the air-cored transformer; insulated terminal means carried by the insulating container for the attachment of a connection from a source of welding current, means connecting said secondary winding between the end-piece and said terminal means, and a conducting screen around said insulating container.

2. Apparatus for electric arc welding comprising in combination an arc-welding-electrode holder, means for producing a supply of welding currents, means for making electrical connection from the welding current supply to an electrode in the holder whereby a welding arc may be maintained across a gap between the electrode and a workpiece to be welded, means for producing across the gap a high frequency high voltage potential to effect initial ionization of the gap thereby to assist in initiation of the arc, which potential-producing means include a generator of high frequency high voltage electrical energy carried by the electrode holder, a generator of lower frequency lower voltage electrical energy to serve as a supply for the high frequency generator, which lower frequency generator is remote from the electrode holder, and an electrical cable connecting the lower frequency generator to the high frequency generator, which high frequency generator is arranged to generate at a potential having a peak value greater than 2,000 volts and a frequency of from 10 to 30 megacycles per second, which lower frequency generator is arranged to generate at a potential of the order of 10 to 20 volts and a frequency of the order of 2,000 to 12,000 cycles per second, and wherein the high frequency generator comprises an iron-cored coupling transformer having primary and secondary windings, means for connecting the primary winding of said coupling transformer to the said electrical cable, and thereby to the lower frequency generator, an air-cored voltage step-up transformer having primary and secondary windings, an oscillatory circuit comprising a spark-gap, a condenser and the primary winding of said air-cored transformer, means connecting the oscillatory circuit to the secondary winding of the coupling transformer to energize the oscillatory circuit, a tuning condenser, and means connecting said tuning condenser across said secondary winding of the air-cored transformer.

3. Apparatus for electric arc welding comprising in combination an arc-welding-electrode holder, means for producing a supply of welding current, means for making electrical connection from the welding current supply to an electrode in the holder whereby a welding arc may be maintained across a gap between the electrode and a workpiece to be welded, means for producing across the gap a radio-frequency high voltage potential to effect initial ionization of the gap thereby to assist in initiation of the arc, which potential-producing means include a generator of radio-frequency high voltage electrical energy carried by the electrode holder, a generator of electrical energy at a lower voltage at a frequency of the order of 2,000 to 12,000 cycles per second to serve as a supply for the radio-frequency generator, which lower voltage generator is remote from the electrode holder, and an electrical cable connecting the lower voltage generator to the radio-frequency generator, which radio-frequency generator comprises an iron-cored coupling transformer having primary and secondary windings, means for connecting the primary winding of said coupling transformer to the said electrical cable, and thereby to the lower frequency generator, an oscillatory circuit comprising a spark-gap, a condenser and an inductance, and means connecting the oscillatory circuit to the secondary winding of the coupling transformer to energize the oscillatory circuit.

4. Apparatus according to claim 3, wherein the radio-frequency generator comprises also an air-cored step-up output transformer, having primary and secondary windings, the primary winding of which air-cored transformer comprises the said inductance.

5. Apparatus according to claim 4, wherein the radio-frequency generator comprises also a tuning condenser and means connecting said tuning condenser across said secondary winding of the air-cored transformer.

WILLIAM ARNOLD APPLETON.

REFERENCES CITED

The following references are of record in the file of this patent:

UNITED STATES PATENTS

| Number | Name | Date |
| --- | --- | --- |
| 1,994,554 | Woltmann | Mar. 19, 1935 |
| 2,399,771 | Tyrner | May 7, 1946 |
| 2,516,016 | Pakala | July 18, 1950 |
| 2,532,807 | Girard et al. | Dec. 5, 1950 |
| 2,574,514 | Volff | Nov. 13, 1951 |

FOREIGN PATENTS

| Number | Country | Date |
| --- | --- | --- |
| 594,486 | Great Britain | Nov. 12, 1947 |